United States Patent
Gordon et al.

(10) Patent No.: US 11,764,969 B2
(45) Date of Patent: Sep. 19, 2023

(54) MEDIA ACCESS CONTROL SECURITY (MACSEC) SANDBOXING FOR SUSPECT DEVICES

(71) Applicant: Schweitzer Engineering Laboratories, Inc., Pullman, WA (US)

(72) Inventors: Colin Gordon, Katy, TX (US); William Herrmann, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 47 days.

(21) Appl. No.: 17/108,631

(22) Filed: Dec. 1, 2020

(65) Prior Publication Data

US 2022/0173907 A1 Jun. 2, 2022

(51) Int. Cl.
*H04L 9/32* (2006.01)
*H04L 9/08* (2006.01)

(52) U.S. Cl.
CPC .......... *H04L 9/3242* (2013.01); *H04L 9/0819* (2013.01); *H04L 9/0838* (2013.01); *H04L 9/0866* (2013.01); *H04L 9/3297* (2013.01)

(58) Field of Classification Search
CPC ... H04L 9/3242; H04L 9/0819; H04L 9/0838; H04L 9/0866; H04L 9/3297
See application file for complete search history.

(56) References Cited

U.S. PATENT DOCUMENTS

| 7,295,112 | B2* | 11/2007 | Bowser | G08B 13/1418 |
| | | | | 340/687 |
| 7,644,290 | B2* | 1/2010 | Ransom | G06Q 50/06 |
| | | | | 340/568.1 |
| 7,729,276 | B2 | 6/2010 | Akyol | |
| 8,368,555 | B2* | 2/2013 | Gilbert | G01D 4/008 |
| | | | | 324/260 |
| 8,386,772 | B2* | 2/2013 | Guan | H04L 63/162 |
| | | | | 380/279 |
| 10,686,595 | B2* | 6/2020 | Chimakurthy | H04L 63/0869 |
| 2013/0298204 | A1* | 11/2013 | Duplessis | H04W 48/16 |
| | | | | 726/4 |

(Continued)

FOREIGN PATENT DOCUMENTS

CN 101282208 A * 10/2008
CN 103209072 A * 7/2013

OTHER PUBLICATIONS

Pramod, "Key pre-distribution scheme with join leave support for SCADA systems", 2018, Elsevier, ScienceDirect, pp. 111-125 (Year: 2018).*

(Continued)

*Primary Examiner* — John B King
*Assistant Examiner* — Alex D Carrasquillo
(74) *Attorney, Agent, or Firm* — Bradley W. Schield; Richard M. Edge

(57) ABSTRACT

A key server may establish an initial media access security (MACsec) connectivity association (CA) between a set of devices on a communication network of a power system. The key server may identify a device in the set of devices on the initial CA as a suspect device. The key server may communicate a new connectivity association key (CAK) of an independent CA to one or more other devices in the set of devices to cause the one or more other devices to join an independent CA without the suspect device.

16 Claims, 6 Drawing Sheets

(56) References Cited

U.S. PATENT DOCUMENTS

| | | | |
|---|---|---|---|
| 2016/0036813 A1* | 2/2016 | Wakumoto | H04L 63/0272 |
| | | | 713/171 |
| 2019/0116183 A1* | 4/2019 | Hussain | H04L 63/08 |
| 2019/0173860 A1 | 6/2019 | Sankaran | |
| 2019/0190910 A1* | 6/2019 | Min | H04L 63/0876 |
| 2019/0281031 A1* | 9/2019 | Pothula | H04L 9/0838 |
| 2019/0342101 A1 | 11/2019 | Hayes | |
| 2019/0386824 A1* | 12/2019 | Havaralu Rama Chandra Adiga | H04L 63/061 |
| 2020/0106719 A1 | 4/2020 | Acharya | |
| 2020/0358764 A1* | 11/2020 | Hojilla Uy | H04L 9/0866 |
| 2021/0048796 A1 | 2/2021 | Rieger | |
| 2021/0067329 A1* | 3/2021 | Coyle | H04L 9/0891 |

OTHER PUBLICATIONS

Pramod, et al.; "Key pre-distribution scheme with join leave support for SCADA systems"; Elsevier, Science Direct; 2018 (Year: 2018).*

Pramod et al.; "Key pre-distribution scheme with join leave support for SCADA systems", Elsevier, Science Direct, pp. 111-125, 2018 (Year: 2018).*

* cited by examiner

MEDIA ACCESS CONTROL SECURITY (MACSEC) SANDBOXING FOR SUSPECT DEVICES

TECHNICAL FIELD

The present disclosure relates generally to communication networks, more particularly, to isolating a suspect device on a Media Access Control Security (MACsec) communication network.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
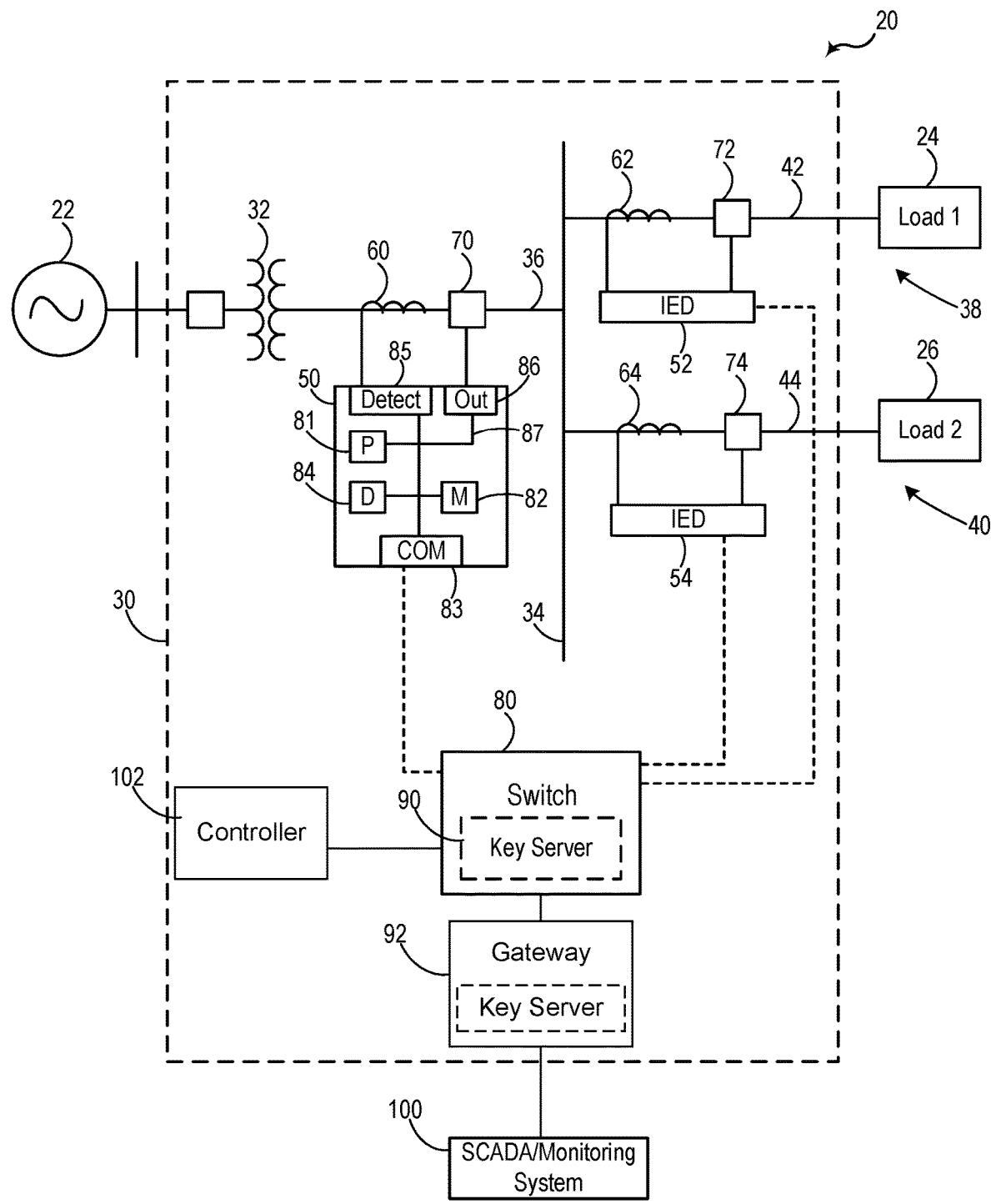
FIG. 1 is a one-line diagram of an electric power delivery system having intelligent electronic devices (IEDs) that communicate over a communication network, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and trip circuit breakers to disconnect electrical equipment to protect the electric power delivery system from exceeding designed operating conditions due to faults.

IEDs may communicate with each other and other electronic devices to facilitate the monitoring, control, and protection of the power delivery system. For instance, IEDs may be connected to a wired Ethernet network, via a network switch, that receives data from a sending IED and forwards the received data to a destination IED. The IEDs may communicate power system data, such as voltage measurements, current measurements, circuit breaker statuses, and circuit breaker commands, among others, to allow the IEDs to better control and protect the power system.

To communicate, IEDs may send the power system data encapsulated into frames of a data link layer on a network. The data link layer may refer to the layer two of the open systems interconnection (OSI) architecture model. To improve security, IEDs may communicate the power system data according to the 802.1AE Institute of Electrical and Electronics Engineers (IEEE) Media Access Security (MACsec) frame format on the data link layer. Data communicated using MACsec frames may include an encrypted payload as well as additional header information.

Intruders may use IEDs or other devices currently on the network or add a device to the network to view power system data and/or to modify power system operations. Accordingly, there is a need in the field to better secure networks used in power systems from intruders.

As explained below, a key server may be used to detect a suspect device on a MACsec connectivity association (CA) of a network. The key server may isolate the suspect device by changing the other devices to a different CA on the network. For example, the key server may send a unicast message to the suspect device to cause the suspect device to change to an isolated CA, thus isolating communication of the suspect device from other devices. As another example, the key server, may send unicast messages to each of the non-suspect devices to cause each of the non-suspect devices to join a new CA.

FIG. 1 is a one-line diagram of a power system 20 that includes a power source 22, such as a distributed generator, that generates and provides power to loads 24 and 26, in accordance with an embodiment. The power system 20 may include equipment, such as electrical generators, transformers, power lines (e.g., transmission and distribution lines), circuit breakers, buses, loads, and the like. A variety of other types of equipment may be included in the power system 20, such as voltage regulators and capacitor banks, among others.

As illustrated, the power source 22 may provide power, via a substation 30, to power the loads 24 and 26. The substation 30 includes a transformer 32 that steps up or steps down the voltage to be provided to a bus 34 via power line 36. Various feeders 38 and 40 may be electrically connected to the bus 34 to provide power to the loads 24 and 26 via power lines 42 and 44. Although illustrated in single-line form for purposes of simplicity, the power system 20 may be a multi-phase system, such as a three-phase electric power delivery system.

The power system 20 may be monitored by one or more IEDs 50, 52, and 54, although additional IEDs may also be utilized. As used herein, an IED (such as IEDs 50, 52, and 54) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. The IEDs 50, 52, and 54 may obtain electric power system data using current transformers (CTs) 60, 62, and 64, and potential transformers (PTs), and the like. The IEDs 50, 52, and 54 may detect events, such as fault events, on the power lines 36, 42, and 44 using current and voltage signals from the CTs 60, 62, and 64 and/or the PTs. The IEDs 50, 52, and 54 may be communicatively coupled to circuit breakers (CBs) 70, 72, and 74 to send control signals to the CBs 70, 72, and 74 to open (i.e., trip) or close the CBs 70, 72, and 74 based on the power system data.

The IED 50 may further include one or more processors 81, a computer-readable medium (e.g., memory 82), a communication interface 83, a display terminal 84, detection circuitry 85, and output circuitry 86 communicatively coupled to each other via one or more communication buses 87. The processor 81 may be embodied as a microprocessor, a general-purpose integrated circuit, an application specific integrated circuit (ASIC), a field programmable gate array (FPGA), and/or other programmable logic devices. It should be noted that the processor 81 and other related items in FIG. 1 (e.g., the memory 82) may be generally referred to herein as "processing circuitry." Furthermore, the processing circuitry may be a single contained processing module or may be incorporated wholly or partially within any of the other elements within the IED 50. It should be noted that FIG. 1 is merely one example of a particular implementation and is intended to illustrate the types of components that may be present in the IED 50.

In the IED 50 of FIG. 1, the processor 81 may be operably coupled with the memory 82 to perform various algorithms. Such programs or instructions executed by the processor 81 may be stored in any suitable article of manufacture that includes one or more tangible, computer-readable media at least collectively storing the instructions or routines, such as the random-access memory (RAM) and the read-only memory (ROM).

In the illustrated embodiment, the IED 50 includes detection circuitry 85 that detects various electrical conditions of the power line 36 based on the input signals. The detection circuitry 85 may include a current conversion circuit (e.g., a transformer) that transform the input signals to levels that may be sampled by the IED 50. The detection circuitry 85 may include analog-to-digital converter(s) that sample the current and voltage signals and produce digital signals representative of measured current and measured voltage on the power line which may be transmitted to the processor 81. The IED 50 may compare the current measurements to thresholds to detect faults and to disconnect the bus 34 from the power source 22. For example, if current on one or more phases exceeds a preset threshold and/or current-over-time exceeds a preset threshold, the processor 81 may detect a fault event and send a signal, via the output circuitry 86, to open the CB 70.

In some embodiments, the IED 50 may include a communication interface 83, such as an ethernet port, to communicate with other IEDs. Further, the IED 50 may include a display terminal 84 and input structures (e.g., Universal-Serial-Bus (USB) ports, buttons, touchscreens, etc.) to allow operators to review events on the power line, change settings, etc.

Each of the IEDs 52 and 54 may have similar components (e.g., processor 81, memory 82, communication interface 83, display 84, detection circuitry 85, and output circuitry 86) to those described with respect to IED 50 to allow the IEDs 52 and 54 to obtain power system measurements, control the CBs 72 and 74, and to communicate. In some embodiments, the IEDs 50, 52, and 54 may communicate power system data via a communication network.

In the illustrated embodiment, the IEDs 50, 52, and 54 may be connected to a switch 80 to form a wired network. The switch 80 may receive frames of power system data from a sending IED and forward the power system data to a receiving IED For example, IED 50 may send and/or receive power system data to or from IEDs 52, and 54, such as voltage measurements, current measurements, and circuit breaker status, among others. If IED 52 were to detect a fault, IED 52 may communicate the fault event to IED 50 and the status of CB 72 via the wired network. If the CB 72 opens, the IED 50 may keep CB 70 closed to allow power to continue to be delivered to load 26. If IED 52 detects a fault and CB 72 remains closed, IED 50 may respond by opening CB 70, thereby isolating the fault. The IED 50 may respond to fault events faster due to the communication network, thus improving the reliability of the power system 20.

The switch 80 may include switching hardware and forwarding circuitry, which may include one or more processors, memory, and communication ports that allow the switch 80 to receive and forward power system data to a receiving device. The switch 80 may be, for example, an unmanaged switch.

The switch 80 may operate as a key server 90 that manages MACsec frame communication on the switch 80 via MACsec keys. In other embodiments, the key server 90 may be embodied as a gateway, a remote terminal unit (RTU), or the like. For example, a gateway may be an electronic device that operates as an access control that authorizes access or prevents unauthorized access onto the communication network from remote devices, such as a supervisory control and data acquisition (SCADA) system 100. The key server 90 may operate using hardware of the switch 80 or the gateway 92 or may include separate hardware to communicate. In certain embodiments, a controller 102, such as an SDN controller, may manage the communication network, based on inputs from a user, by sending control instructions to the switch 80. In some embodiments, the key server 90 may be a part of an intrusion detection system (IDS) that prevents intruders on the network by inspecting the messages. In certain embodiments, the controller 102 may also be a key server.

Figure 2:
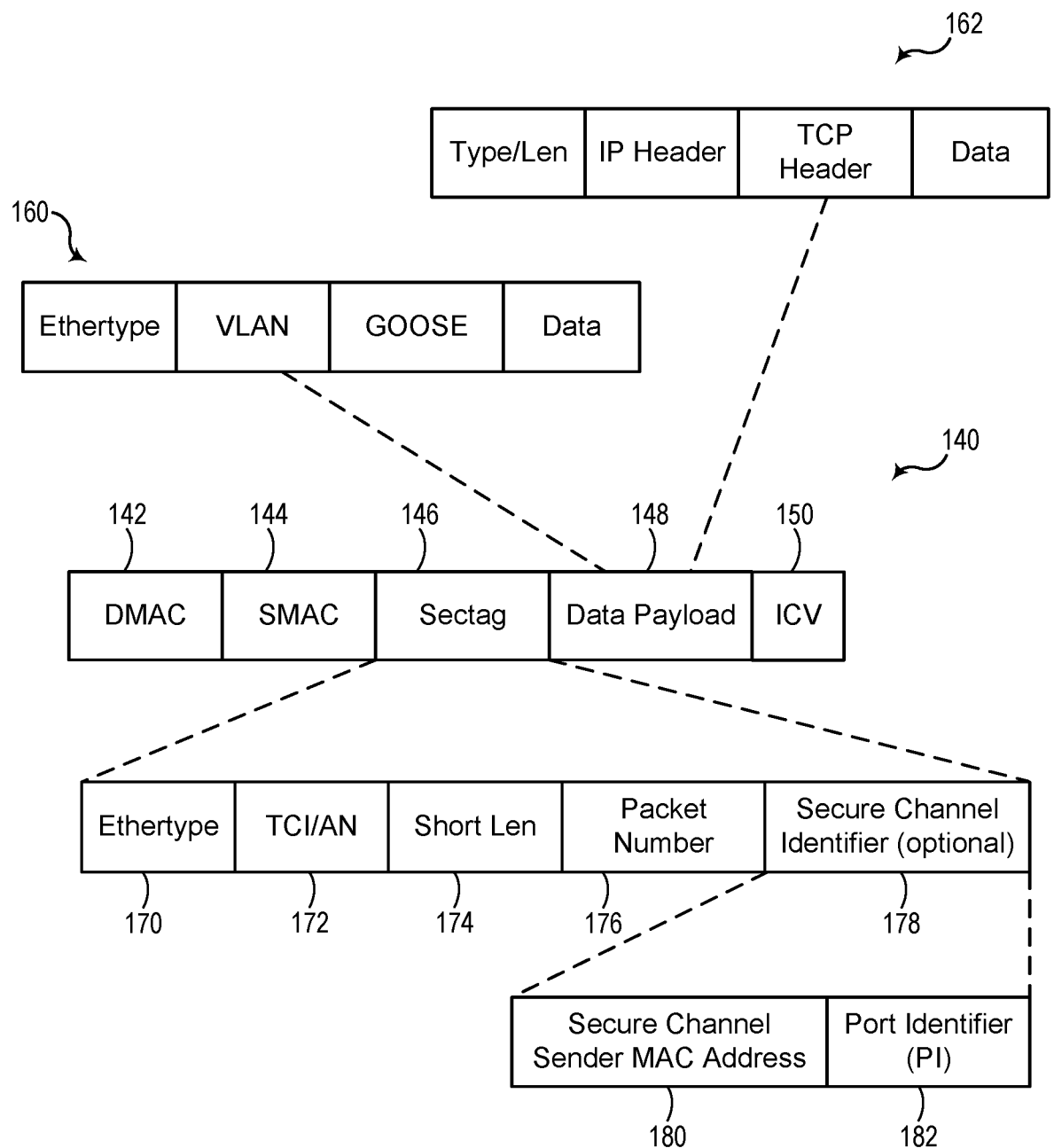
FIG. 2 is a layout of a Media Access Control Security (MACsec) frame that may be communicated on the communication network of FIG. 1, in accordance with an embodiment.

FIG. 2 is a field layout of an embodiment of a MACsec frame 140 that may be used in the communication network of the power system 20. The MACsec frame 140 may include a destination MAC address 142, a source MAC address 144, a security tag (Sectag) 146, an authenticated and (optionally) encrypted payload 148, and an integrity check value (ICV) 150. The MAC address may be a unique number of a network interface controller (NIC) of the device. The MAC address may be stored in firmware or ROM by the manufacture of the device. Some or all of the payload 148 may be encrypted depending on the application protocol of the MACsec frame. For example, MACsec frames communicating GOOSE messages 160 may include a first set of header fields and MACsec frames communicating DNP messages 162 may include a second set of header fields, different from the first set of header fields.

The Sectag 146 may include an Ethertype 170, a TCI/AN 172, a short len 174, and a packet number 176, which may be used to identify the decryption key and detect transmission of repeated frames. Further, in MACsec frames 140, the Sectag 146 may include a secure channel identifier 178, which is an optional field. The secure channel identifier 178 may include a secure channel sender MAC address 180 and a port identifier (PI) 182. The ICV 150 may ensure the integrity of the MACsec frame 140 by allowing the recipient to detect errors in the transmission process.

Figure 3:
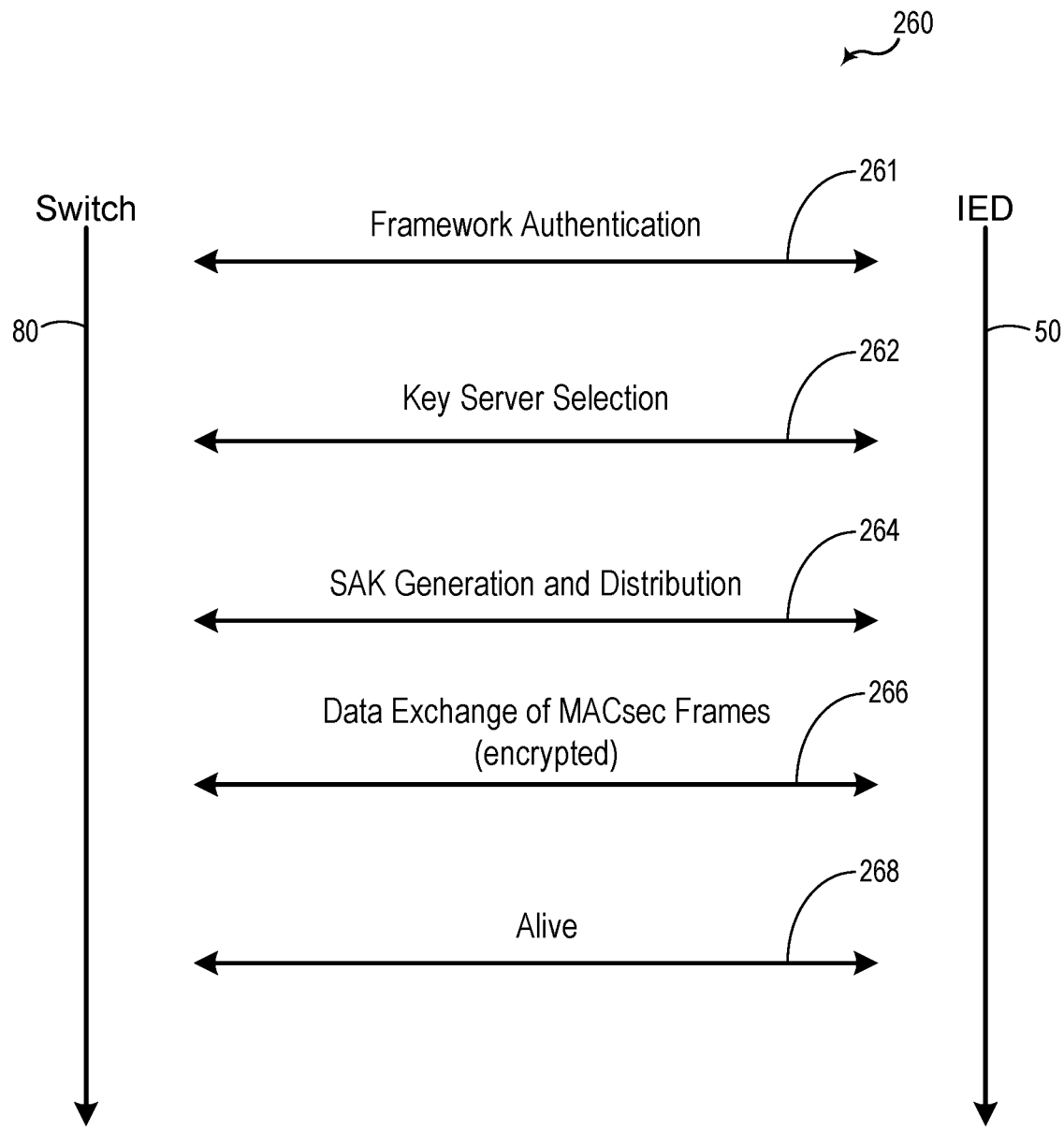
FIG. 3 is a timing diagram of an MACsec Key Agreement (MKA) process used to communicate MACsec frames between IEDs over the communication network of FIG. 1, in accordance with an embodiment.

FIG. 3 is a timing diagram 260 of a MACsec key agreement (MKA) protocol performed between a key server, such as the switch 80 or another IED, and an IED 50 to establish a connectivity association (CA) that connects peer-to-peer devices in the communication network. Before MKA begins, framework authentication may occur in which each of the devices authenticate the other (arrow 261). For example, secure pre-shared key (PSK) authentication may be used in which each device uses shared keys to ensure that the devices are in fact allowed on the communication network. As another example, a master session key (MSK) may be obtained from an extensible authentication protocol (EAP) session. The MSK may then be used to determine a connectivity association key (CAK) for the MKA process. In another case, a user-entered passcode may be used to derive a CAK.

Following the framework authentication, the MKA process may begin with the peer-to-peer devices selecting a key server. In the illustrated embodiment, the switch 80 may be selected as the key server (arrow 262). The process may continue with the key server generating secure association keys (SAKs), which may refer to a random value that is generated based on the CAK. The key server may then communicate the SAK to any of the peer connected devices on the communication network (e.g., IEDs 50, 52, and 54), thereby establishing a MACsec link between the switch 80 and the IED 50 (arrow 264).

The switch 80 and the IED 50 may then exchange power system data via MACsec frames (arrow 266). The switch 80 and the IED 50 may further continue to send keep alive signals indicating that the CA is still alive (arrow 268). The MKA may be repeated for each of the application protocols that are used to communicate between the switch 80 and the IED 50.

Each of the IEDs 50, 52, and 54 may be connected over the same CA to allow communication between the devices. The IEDs 50, 52, and 54 may communicate power system data, such as monitoring, control, and protection data between the IEDs via the CA. The key server 90 may facilitate MACsec and MKA protocol communication between the devices, such as providing new CAKs to each of the devices as described in FIG. 3.

As mentioned above, intruders may attempt to obtain or control the monitoring, control, and protection data between the IEDs. For example, an intruder may install instructions on an IED that allows the IED to harvest the monitoring data received via the communication network or to send control signals to other IEDs via the communication network. As explained below, a device suspected of tampering by an intruder or otherwise may be detected and removed from the communication network to prevent the suspect device from sending or receiving unauthorized data.

Figure 4:
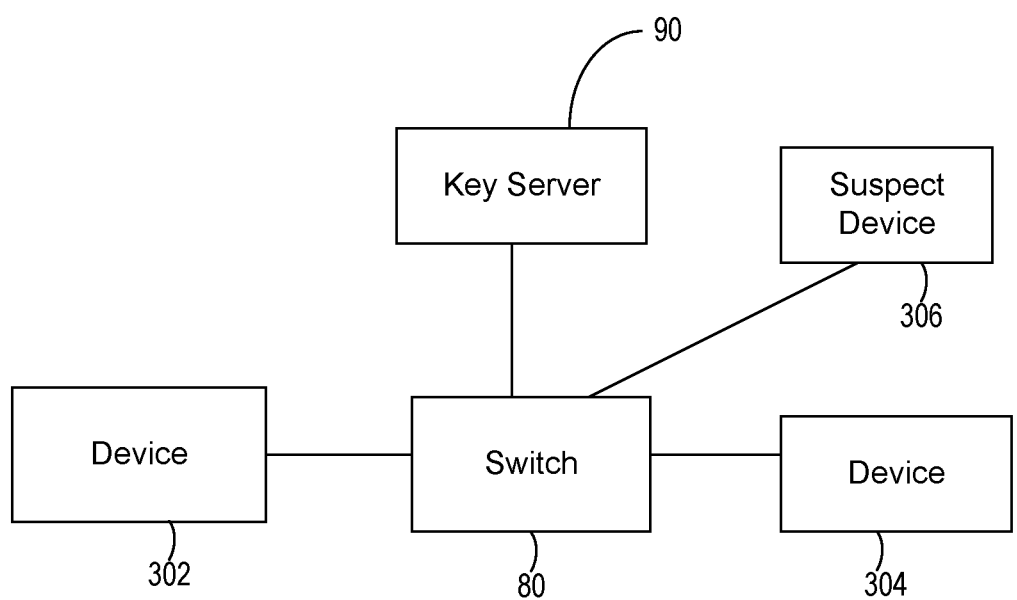
FIG. 4 is a block diagram of the communication network of FIG. 1 with a suspect device connected, in accordance with an embodiment.

FIG. 4 is a network diagram of connections between a set of devices (i.e., hosts) on an initial CA. The network diagram has a set of devices that includes device 302, device 304, and a suspect device 306 on the initial CA. The devices in FIGS. 4 and 5 may be IEDs, such as IEDs 50, 52, and 54. Initial, in this context, may refer to a CA that is established before detection of a suspect device 306. In some cases, the initial CA may be from when the devices were first commissioned, or it may be from a subsequent CA communicated across the devices prior to detecting the suspect device 306.

In addition to the MKA process used to establish communication and MACsec messages discussed above with FIGS. 2-3, MKA also has protocol-related messages, referred to as MKA messages, to adjust settings in communication. For example, MKA messages may include a parameter set type (PST) to communicate a new CAK between the devices. The PST may indicate the format and payload in the MKA message. For example, the PST may indicate that a payload of the MKA message includes a new CAK to be used between communication devices. As another example, the PST may indicate that the payload includes a list of live peers on the communication network.

The key server 90 may identify a suspect device 306 from the set of devices based on an indication that the suspect device 306 has been tampered with. For example, the key server 90 may detect communication downtime of the suspect device, detect an unexpected change in communication (e.g., change in communication type, data communicated, or frequency of communication) of the suspect device 306, or receive communication from one of the devices 302, 304, or 306 indicating sensors detect physical tampering of the suspect device 306. In some embodiments, the key server 90 and the suspect device 306 may be located such that the key server 90 may detect physical characteristics of the suspect device 306 indicative of tampering.

The key server 90 may then isolate communication of the suspect device 306 from the communication of the other devices 302 and 304 in the set of devices on the communication network. In a first technique, isolation of the suspect device 306 may occur by communicating a new CAK to the suspect device 306 using a unicast message. A unicast message is an MKA message that is sent to a particular device by specifying a particular receiving address in the MKA message. A multicast message may be an MKA message that is broadcasted to any of the devices on the switch 80 over the CA. By communicating the unicast message with an isolated CAK to the suspect device 306, the suspect device 306 may transition to an isolated CA. During a CA rollover in which each of the devices is transferred to a different CA, the initial key may be removed from memory of the suspect device 306. The key server 90 may then send a multicast message to the remaining devices of a new CAK to allow the remaining devices 302 and 304 to transition to an independent CA that is separated from the suspect device 306.

In a second technique, isolation of the suspect device 306 may again occur by communicating a unicast MKA message with a PST of an isolated CAK to the suspect device 306 to isolate the suspect device 306 onto an isolated CA. The key server 90 may then send separate unicast MKA messages to each of the other devices 302 and 304 that are not suspected of tampering with a new CAK to allow the devices 302 and 304 to transition to an independent CA without the suspect device 306.

In a third technique, the key server 90 may send separate unicast MKA messages to each of the devices 302 and 304 with a new CAK to transition the devices 302 and 304 to an independent CA. The key server 90 may not update the suspect device 306 and leave the suspect device 306 on the initial CA, thereby isolating communication of the suspect device 306 from the remaining devices 302 and 304.

Upon isolating the suspect device 306, the key server 90 may notify an operator that there is a suspect device on the communication network. The operator may inspect the suspect device 306, reset the instructions on the suspect device 306 to remove any changes caused by tampering, and allow the suspect device to again communicate with the one or more other devices 302 and 304

Figure 5:
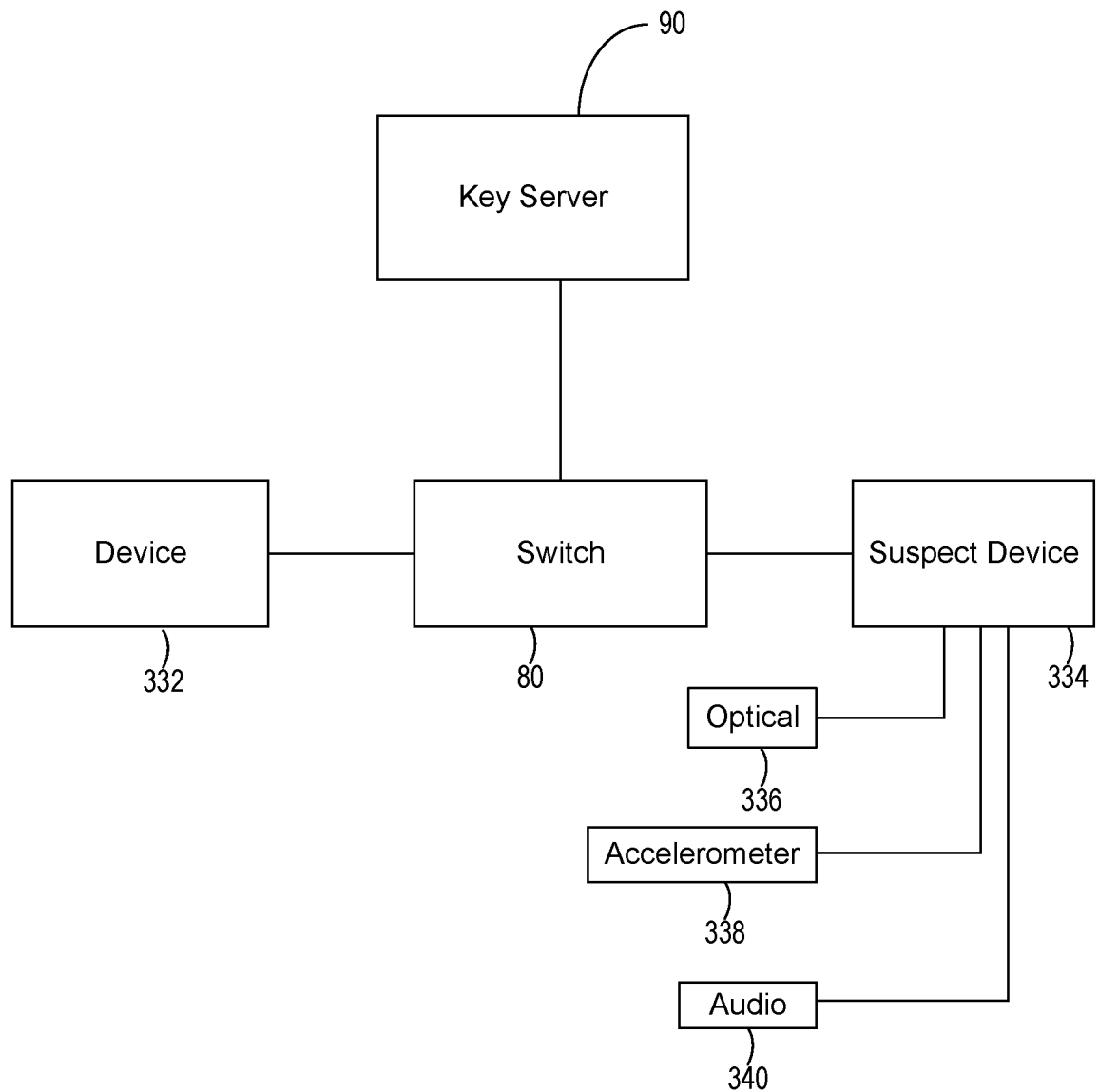
FIG. 5 a block diagram of the communication network of FIG. 1 with a suspect device that detects tampering via physical sensors, in accordance with an embodiment.

FIG. 5 is another block diagram of a communication network that may be used in the power system 20. The communication network includes the key server 90, the switch 80, and a device 332. In the illustrated embodiment, the suspect device 334 or a device physically located proximate to the suspect device 334 may detect, via one or more physical sensors, tampering of the suspect device 334. For example, an optical sensor 336 may detect changes in light associated with a physical presence at the suspect device 334. As another example, an accelerometer 338 may detect movement of the suspect device 334 and/or an audio sensor 340 may detect sounds associated with tampering of the suspect device 334. In some embodiments, a combination of downtime of the suspect device 334, light, movement, and changes in network activity may be used to identify a device as a suspect device. Further, the suspect device 334 may detect tampering using the physical sensors at the suspect device and automatically communicate a tampering signal indicating the detection to the key server 90 to begin the process of isolating the suspect device 334.

Figure 6:
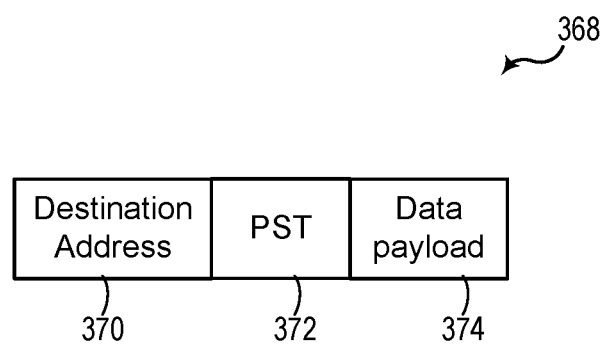
FIG. 6 is a layout of parts of a MACsec key agreement (MKA) message that may be communicated over the communication network of FIG. 1, in accordance with an embodiment.

FIG. 6 is a block diagram of an MKA message 368 that may be sent by the key server 90 to communicate MKA protocol-related messages to devices on the communication network. The MKA message 368 may include a destination address 370, a PST 372, and a data payload 374, among other fields. As mentioned above, the destination address may not be specified (e.g., set to zeroes, set to a predetermined multicast address, or skipped) to a particular device to cause the switch 80 to multicast the MKA message 368 to any of the devices connected to the switch 80. Further, a particular destination address of a device may be specified to cause the switch 80 to unicast the MKA message 368 to the specified device without messaging other devices connected to the switch 80.

The MKA protocol may have a predetermined list of PSTs that may be set in an MKA message to describe the data payload 374. For example, the PST may indicate that the data payload 374 contains a new CAK. The data payload 374 may contain the new CAK that allows the devices to transition between CAs. By transitioning other devices to a separate CA, suspect devices on the communication network may be sandboxed onto an isolated CA, thereby protecting the communication network from unauthorized access due to tampering.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A key server, comprising:
    a memory; and
    a processor operatively coupled to the memory, wherein the processor is configured to execute instructions stored on the memory to cause operations comprising:
        establishing an initial media access security (MACsec) connectivity association (CA) between a set of devices on a communication network of a power system;
        identifying a device in the set of devices on the initial CA as a suspect device; and
        upon identifying the suspect device, sending one or more unicast MACsec key agreement (MKA) messages having a new connectivity association key (CAK) of an independent CA to the suspect device to cause the suspect device to join the independent CA;
        removing from a memory of the suspect device an initial key associated with the initial CA to transition the suspect device to the independent CA and away from the initial CA;
        thereby isolating communication of the suspect device from the other devices.

2. The key server of claim 1, wherein each unicast MKA message comprises a destination address of a corresponding device in the other devices.

3. The key server of claim 1, wherein the processor is configured to cause operations comprising detecting that the suspect device is suspicious based on downtime of the suspect device.

4. The key server of claim 1, wherein the processor is configured to cause operations comprising receiving, from the suspect device, a tampering signal indicating that the suspect device has been tampered with based on physical sensors of the suspect device, the key server, or another device.

5. A non-transitory, computer readable medium comprising instructions configured to be executed by a processor to cause operations comprising:
    establishing, via a key server, an initial connectivity association (CA) using media access security (MACsec) key agreement (MKA) protocol between a set of devices on a communication network of a power system;
    identifying a suspect device in the set of devices on the initial CA; and
    upon identifying the suspect device, communicating to the suspect device, via the key server, a unicast MKA message comprising a new key as an isolating connectivity association key (CAK) to cause the suspect device to join an independent CA using the isolating CAK and remove from the memory of the suspect device an initial key associated with the initial CA to transition the suspect device to the independent CA and away from the initial CA, thereby isolating communication of the suspect device from any other device of the set of devices.

6. The non-transitory, computer readable medium of claim 5, comprising instructions configured to be executed by the processor to cause operations comprising sending, via the key server, a plurality of unicast messages to each of the other devices on the communication network to reconnect each of the other devices to an independent CA following isolating the suspect device to prevent the suspect device from rejoining communication with the other devices.

7. The non-transitory, computer readable medium of claim 6, wherein each unicast message in the plurality of unicast messages comprises a destination address of a corresponding device of the other devices.

8. A system, comprising:
- a first device;
- a second device configured to be communicatively connected to the first device via an initial connectivity association (CA); and
- a key server configured to:
  - establish the initial CA using media access security (MACsec) key agreement (MKA) protocol between the first device and the second device on a communication network of a power system;
  - determine that tampering is suspected of the first device; and
  - upon identifying the first device as the suspect device,
    - sending a unicast MKA message with a new connectivity association key (CAK) and a destination address of the suspect device;
    - sending a unicast MKA message with a different new CAK and a destination address of the second device; and,
    - deleting an initial CAK of the initial CA from the suspect device;
  - to transition the suspect device to an independent CA while preventing reception of the new CAK by the second device to allow the suspect device to join the independent CA without the second device.

9. The system of claim 8, wherein the first device comprises a physical sensor configured to detect tampering of the first device.

10. The system of claim 9, wherein the physical sensor comprises an optical sensor, an accelerometer, an audio sensor, or any combination thereof.

11. The system of claim 8, wherein the first device is configured to communicate a tampering signal to the key server to indicate that tampering has occurred with the first device.

12. The system of claim 8, wherein the key server is configured to determine that tampering has occurred based on a combination of physical sensors of the first device, downtime of the first device, and changes in network activity.

13. The system of claim 8, wherein the key server is configured to communicate an isolated CAK to the first device to cause the first device to transition to the independent CA.

14. The system of claim 8, wherein the key server is configured to determine that tampering is suspected on the first device based on changes in network activity by the first device.

15. The system of claim 8, wherein the key server is configured to leave the second device on the initial CA without updating the second device to isolate the first device on the independent CA.

16. The non-transitory, computer readable medium of claim 5, wherein the unicast message is sent as a part of a periodic CA rollover process.

\* \* \* \* \*